July 28, 1953 — L. O. FUNDINGSLAND — 2,646,737

BEARING FOR WEEDER RODS

Original Filed June 10, 1949

INVENTOR.
L. O. Fundingsland
BY Martin E. Anderson
ATTORNEY

Patented July 28, 1953

2,646,737

UNITED STATES PATENT OFFICE 2,646,737

BEARING FOR WEEDER RODS

Laurence O. Fundingsland, Burlington, Colo.

Original application June 10, 1949, Serial No. 98,317, now Patent No. 2,603,137, dated July 15, 1952. Divided and this application March 22, 1952, Serial No. 278,054

2 Claims. (Cl. 97—42)

1

This invention relates to agricultural implements and more particularly to bearings for rod weeder attachments for chisel plows, the present application being a division of my application, Serial No. 98,317, filed June 10, 1949, now Patent No. 2,603,137, July 15, 1952, which in turn is a continuation-in-part of my application Serial No. 46,694, filed August 28, 1948, now Patent No. 2,528,270, October 31, 1950.

In the above identified application and patent I have disclosed a conventional chisel plow to one end of which is secured a power take off attachment, driven by one of the supporting wheels, suitable mechanism being provided to drive an elongated weeder rod rotatably supported by the chisels. It has been found that under certain conditions of operation, in certain types of soil the weeder rod binds to some extent in its supporting bearings which creates unnecessary load and wear on the driving mechanism.

One of the objects of the invention is to provide a weeder rod attachment for plows wherein the weeder rod bearings carried by the chisels are designed to eliminate binding of the weeder rod in its bearings when the chisels are deflected by striking obstructions or soil conditions which flexes the chisels to varying extent.

Still further objects, advantages and salient features will become more apparent from a consideration of the description to follow, the appended claims, and the accompanying drawing, in which:

Figure 1:
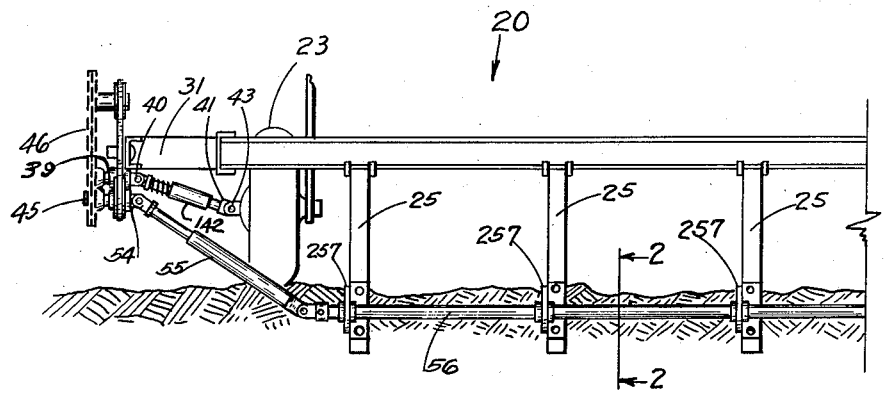
Figure 1 is a rear elevation of a portion of the chisel plow, this figure being the same as Figure 1 of the identified copending application, of which this is a division.

Referring in detail to the drawing wherein like reference numerals represent like parts, a conventional chisel plow is supported at its ends, by wheels, a wheel at one end has been shown and by reference designated character 23.

The frame supports a plurality of resilient pendents 25 which have chisels 26 at their ends adapted to move below the surface of the ground. A weeder rod 56 is journaled on these pendents in a manner to be more fully described hereinafter, and is driven from wheel 23 through shaft 43, universal joint 41, extensible shaft 142, universal joint 40, shaft 39, sprockets and chains 45, 46,

2 shaft 54, and extensible propeller shaft 55, all as more fully described in my above identified copending application. The points of novelty over said application will now be described.

Figure 3:
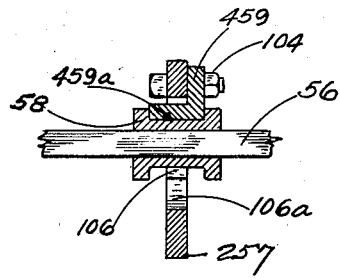
Figure 3 is a section taken on line 3—3, Figure 2.
Figure 4:
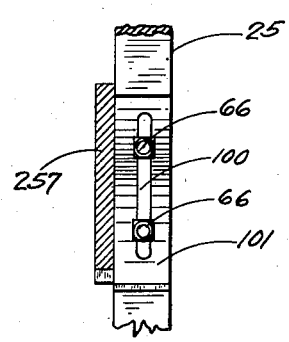
Figure 4 is a section taken on line 4—4, Figure 2.

Pendents 25 each support a bracket 257, by a pair of bolts 66 which extend through suitable holes in each pendent and through an elongated slot 100 in end flange 101 on the forward end of each bracket. The rear end of each bracket is provided with a large circular hole 103 in which is disposed a spool 58, this spool has flanges at the ends of the hub portion as clearly shown in Figure 3. A bearing plate 459 having a semicircular wearing surface 459a abuts the hub portion of the spool 58 between said flanges; this plate is adjustably secured to bracket 257 by bolts 104 which pass through enlarged or elongated openings 105 in bracket 257. Enlarged or elongated openings may also be employed in bearing plate 459, if desired, or in both the bearing plate and bracket. When the bearing plate is in the desired position of adjustment there is a space 106 between the spool 58 and bracket 459 which performs an important function which will now be described.

When frame 20 is moving over the ground the weeder rod is rotating below the ground surface, as shown in Figure 1. The pendents 25 are resilient hence when one or more of the chisels strikes an obstruction, or ground which offers uneven resistance to the chisels, one or more of the pendents bend rearwardly. If the spools were journaled to move with the pendents as they bend rearwardly it will be apparent that the weeder rod would cause one or more of the spools to bind. This is obviated by the construction that forms the subject of the present invention since bracket 257 and bearing plate 459 are free to move rearwardly when the pendent bends rearwardly, the spool remaining in the same position relative to frame 31. In other words, the bearing plate 459 temporarily disengages the spool, a forward and lower portion of plate 257 adjacent opening 103 moving into space 106. Space 106 may be enlarged as desired, depending upon the particular soil and amount of spring of the pendents. Slot 106a is wider than the diameter of the spool hub but narrower than the diameter of the spool flange, which permits the slot to move over and receive the spool hub but prevents the spool from moving endwise on the weeder rod.

Figure 2:
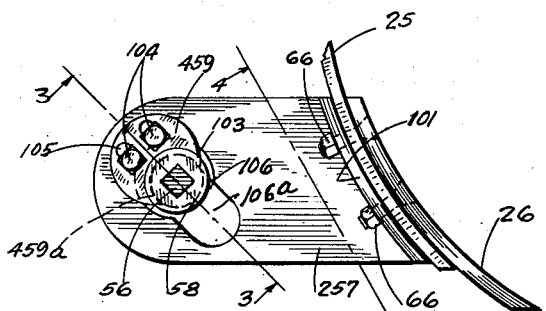
Figure 2 is an enlarged section taken on line 2—2, Figure 1.

When the obstruction has been passed bearing plate 459 returns into engagement with the rearward and upper portion of the spool, as shown in Figure 2.

Many modifications of the invention will now become apparent within the spirit thereof. For example, the weeder rod brackets 257 may be so constructed that the weeder rod is in any desired position relative to the chisels and other means will become apparent which permit distortion of the pendents without distorting the weeder rod. It is not intended, therefore, to limit the invention to the precise details illustrated, except as defined by the scope of the appended claims.

Particular attention is called to the fact that opening 103 must be large enough to permit at least one flange 58 to pass through and when the bearing plate is in position the spool cannot move along the rod to any appreciable extent. Small flexures of the pendents can occur while the hub is still within the area of opening 103. If the pendent is bent to a greater extent as it may be if it strikes a stone the hub of the spool moves into that part of the opening designated by 106a.

What I claim as new is:

1. In a rod weeder of the type having a wheel supported frame and provided at its rear with a plurality of resilient spaced plow pendents, a weeder rod bearing secured to the rear of each pendent, said bearing comprising a bracket plate having means at its front end for effecting connection with the rear of a plow pendent, said plate having a keyhole shaped opening near its rear end, the circular portion of said opening being at the rear, the lateral notch extending downwardly and forwardly, a spool positioned in the opening, the spool having a tubular hub portion with end flanges of greater diameter, the circular opening being of sufficient size to permit the spool flanges to pass, the notch having a width sufficient to receive the hub of the spool but less than the diameter of the end flanges, a bearing block positioned in the circular part of the opening to the rear of the spool, and means for attaching the bearing block to the bracket.

2. A bearing in accordance with claim 1 in which the bearing block is attached to the bracket by means that permits it to be adjusted to compensate for wear.

LAURENCE O. FUNDINGSLAND.

References Cited in the file of this patent

UNITED STATES PATENTS

| Number | Name | Date |
|---|---|---|
| 1,804,672 | Calkins | May 12, 1931 |
| 1,831,119 | Jahn | Nov. 10, 1931 |
| 1,902,897 | Robinson | Mar. 28, 1933 |